United States Patent [19]

Fair et al.

[11] Patent Number: 4,598,351
[45] Date of Patent: Jul. 1, 1986

[54] SOFT-START CONTROL FOR A PUSH-PULL CONVERTER-REGULATOR WITH A FLUX BALANCING CIRCUIT

[75] Inventors: Donald G. Fair, Belvidere, Ill.; Pandipati R. K. Chetty, Gaithersburg, Md.

[73] Assignee: Sundstrand Corporation, Rockford, Ill.

[21] Appl. No.: 584,114

[22] Filed: Feb. 27, 1984

[51] Int. Cl.$^4$ .................................................. H02M 3/337
[52] U.S. Cl. ............................................ 363/49; 363/56; 363/97
[58] Field of Search .................. 363/17, 25, 26, 49, 363/56, 97, 21, 134; 323/321, 238, 281, 901, 288; 307/356; 318/430

[56] References Cited

U.S. PATENT DOCUMENTS

| | | | |
|---|---|---|---|
| 3,959,714 | 5/1976 | Mihelich | 323/288 |
| 4,180,852 | 12/1979 | Koizumi et al. | 363/49 |
| 4,195,335 | 3/1980 | Murakami et al. | 363/49 |
| 4,307,440 | 12/1981 | Inoue et al. | 363/49 |
| 4,353,114 | 10/1982 | Saleh | 363/21 |
| 4,477,867 | 10/1984 | Pellegrino | 363/26 |

FOREIGN PATENT DOCUMENTS

| | | | |
|---|---|---|---|
| 41718 | 4/1978 | Japan | 363/21 |
| 112880 | 9/1981 | Japan | 363/21 |
| 141727 | 9/1982 | Japan | 363/21 |
| 66577 | 4/1983 | Japan | 363/49 |
| 966681 | 10/1982 | U.S.S.R. | 363/49 |

Primary Examiner—William H. Beha, Jr.
Attorney, Agent, or Firm—Wood, Dalton, Phillips, Mason & Rowe

[57] ABSTRACT

A soft-start control for use with a push-pull converter-regulator having a flux balancing circuit. The push-pull converter is responsive to a pulse width modulated waveform to provide a DC output, the converter having an error amplifier for comparing the DC output to a reference signal to vary the duty cycle of the pulse width modulated waveform. The soft-start circuit provides a varying reference signal to the error amplifier, the reference signal gradually increasing from zero to a predetermined level during the start-up of the converter.

6 Claims, 1 Drawing Figure

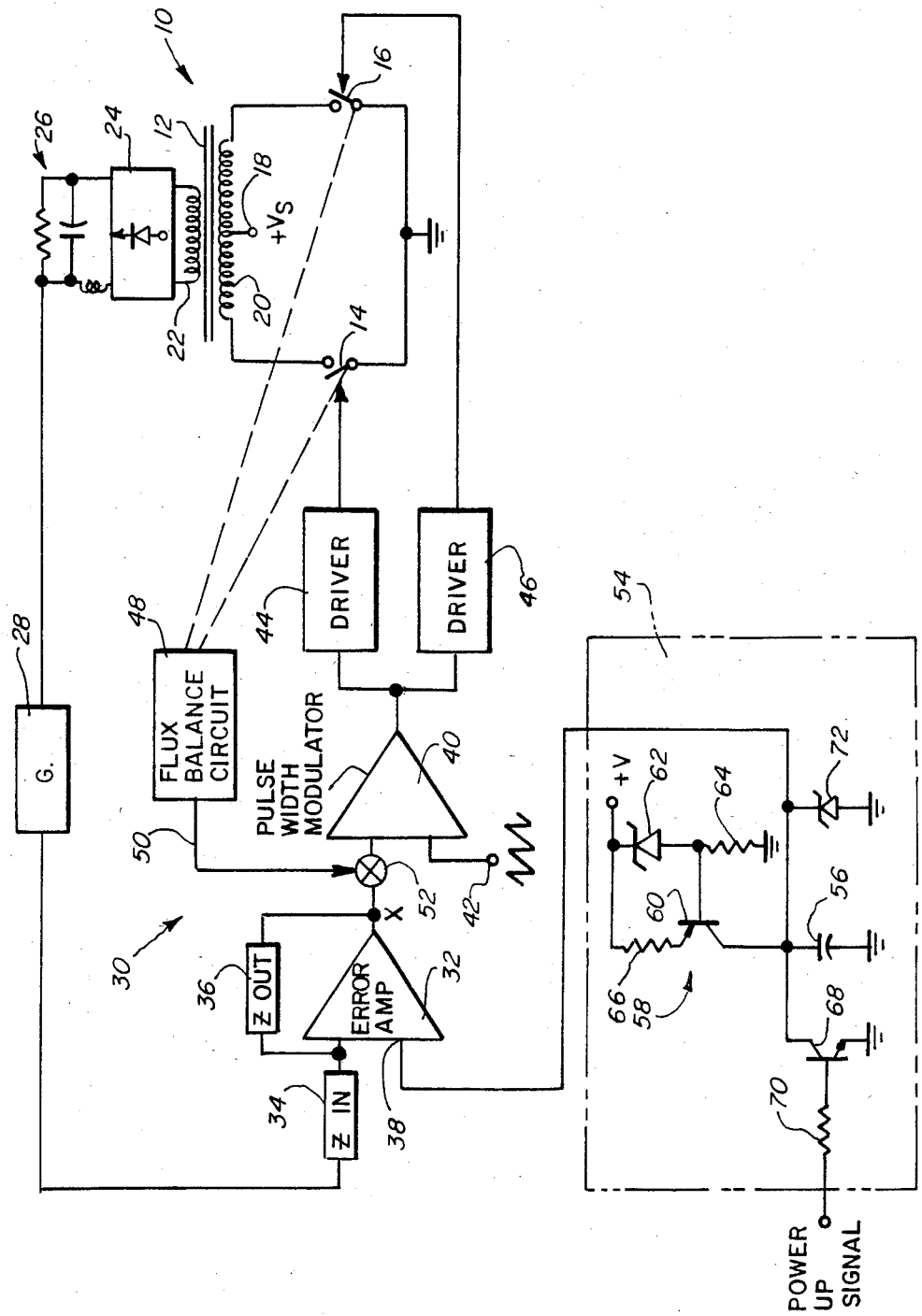

4,598,351

SOFT-START CONTROL FOR A PUSH-PULL CONVERTER-REGULATOR WITH A FLUX BALANCING CIRCUIT

TECHNICAL FIELD

The present invention relates to a soft-start control for use with a push-pull converter-regulator and more particularly to a soft-start control having a short soft-start period, the control being used with a flux balancing circuit without overriding the circuit.

BACKGROUND OF THE ART

In a push-pull converter having a center-tapped transformer and a pair of power switches which are connected to the center tapped primary transformer winding, the switches are controlled to alternately conduct, thereby developing an AC output in the secondary winding of the transformer. The AC output from the secondary winding of the transformer is rectified and filtered to provide a regulated DC output voltage. The regulated DC output voltage is applied to a feedback control circuit which detects errors in the DC output and controls the power switches to maintain the DC output at a desired level. The feedback control circuit typically includes an error amplifier which compares the regulated DC output to a fixed reference. The output of the error amplifier is then applied to a pulse width modulator which compares the error signal to a ramp signal to provide a pulse width modulated waveform having a duty cycle which varies with the error signal, the pulse width modulated waveform being used to control the power switches to regulate the DC output.

In order to prevent large inrush currents during the start-up of the system, soft-start controls have been employed. Known soft-start controls such as shown in Koizumi et al U.S. Pat. Nos. 4,180,852 and Saleh 4,353,114 for a DC to DC converter have been connected to the output of the error amplifier so that the duty cycle of the pulses generated by the pulse generator gradually increases when the converter is first turned on. Such known soft-start controls typically include a capacitor connected across the output of the error amplifier, the capacitor being charged by a constant current source. The soft-start capacitor holds the output of the error amplifier so that it does not go to a high level immediately after the system has been turned on, but slowly increases to the desired level.

The soft-start duration for such controls is typically long in order to bring the inrush currents down to acceptable levels. However, a long soft-start duration is not desirable for many applications. When the soft-start duration is large, a flux imbalance in the transformer may result which can cause saturation of the transformer core resulting in failure of the system. Known flux balancing circuits which provide a correction signal to vary the output of the error amplifier are very effective during the steady-state operation of the converter to bring the transformer into a balanced condition. However, during the start-up of the converter, the known soft-start circuits, connected to the output of the error amplifier, override the operation of the flux balancing circuit which is also connected to the output of the error amplifier. Therefore, flux balancing circuits have not been effective during start-up to prevent flux imbalances from causing system failures.

DISCLOSURE OF THE INVENTION

In accordance with the present invention, the disadvantages of prior soft-start controls for push-pull converters as discussed above have been overcome.

The soft-start control of the present invention may be used with a flux balancing circuit without overriding the circuit. The soft-start control includes a capacitor which is charged by a constant current source to a level determined by a zener diode connected in parallel with the capacitor. Also connected in parallel with the capacitor is a normally closed switch which is opened during the start-up of the system. The voltage across the capacitor is applied to the error amplifier to provide a varying reference voltage which gradually increases from zero when the switch is opened to a level determined by the zener diode.

The gradual increase of the reference voltage output from the soft-start circuit prevents the output of the error amplifier from going to a high level as soon as the system is turned on. The gradual increase in the output of the error amplifier allows the duty cycle of the pulse width modulated waveform to gradually increase to a desired level to prevent large inrush currents. Further, because of the gradual increase in the reference voltage, the flux balancing circuit operates without being overridden by the soft-start circuit.

BRIEF DESCRIPTION OF THE DRAWING

The drawing is a block diagram of a push-pull converter employing the soft-start control circuit of the present invention.

BEST MODE FOR CARRYING OUT THE INVENTION

A push-pull converter 10 includes a center tapped transformer 12 and a pair of power switches 14 and 16 which are connected to the center tapped primary transformer winding 20. The power switches 14 and 16 are controlled to alternately conduct. Alternate conduction of the switches chops the input DC voltage applied to the center tap 18, thereby inducing an alternating output in the secondary winding 22 of the transformer 12. The AC output from the secondary winding 22 of the transformer is rectified by a rectifier network 24, the output of which is applied to a filter 26 to provide a DC output voltage. The DC output voltage is applied to an attenuation stage 28, the output of which is applied to a feedback control circuit generally designated 30 which detects errors in the DC output and controls the power switches to maintain the output at a desired level.

The feedback control circuit 30 includes an error amplifier having an input impedance 34 and an output impedance 36. The error amplifier 32 compares the DC output signal from the converter 10 to a reference voltage applied to an input terminal 38. The output of the error amplifier 32 is applied to a pulse width modulator 40 which compares the error signal to a ramp signal 42 input from a stable frequency ramp signal source, not shown. The output of the pulse width modulator 40 is a pulse width modulated waveform having a duty cycle which varies with the error signal. The pulse width modulated waveform from the modulator 40 is applied to a pair of drivers 44 and 46 which control the respective switches 14 and 16 to provide a regulated DC output from the converter 10.

In order to prevent flux imbalances which cause the transformer core to saturate, a flux balance circuit 48 is employed. The flux balance circuit 48 senses any imbalance in the currents flowing through the switches 14 and 16 and provides a correction signal output on line 50 which is summed with the output of the error amplifier 32 by means of an adder 52. The correction signal output from the flux balance circuit 48 modifies the output of the error amplifier such that the duty cycle of one of the switches 14, 16 is varied with respect to the duty cycle of the other switch to bring the transformer 12 into a balanced condition. Details of the flux balance circuit 48 may be found in the copending U.S. patent application Ser. No. 549,980 filed Nov. 8, 1983.

In order to prevent the output of the error amplifier 32 from going to a high level immediately after the system is turned on so as to prevent large inrush currents during start-up, the soft-start control circuit 54 of the present invention is employed to provide a reference voltage to the error amplifier 32 which gradually increases from zero to a predetermined level. The soft-start circuit 54 includes a capacitor 56 which is charged by a constant current source generally designated 58. The constant current source 58 includes a PNP transistor 60 having a base connected between a zener diode 62 and a resistor 64 which are connected between a DC voltage source and ground. The emitter of the transistor 60 is connected to the DC voltage source through a resistor 66 and the collector of the transistor 60 is connected to the capacitor 56 to linearly charge the capacitor. A normally closed or conducting NPN transistor switch 68 is connected across the capacitor 56 to signal the start-up of the converter 10. When the converter 10 is to be turned on, a power up signal applied to the base of the transistor 68 through a resistor 70 goes from a high state to a low state, opening the switch so that the capacitor 56 charges. The capacitor 56 charges from zero when the switch 68 opens to a level determined by a zener diode 72 which is connected in parallel with the capacitor. The voltage across the capacitor 56, as limited by the zener diode 72, is applied to the input terminal 38 of the error amplifier 32 to provide a varying reference voltage thereto.

The gradual increase of the reference voltage output from the soft-start circuit prevents the output of the error amplifier from going to a high level as soon as the system is turned on. The gradual increase in the output of the error amplifier allows the duty cycle of the pulse width modulated waveform output from the modulator 40 to gradually increase to a desired level to prevent large inrush currents. Because of the gradual increase of the reference voltage, the flux balancing circuit 48 is not overridden, but is allowed to vary the output of the error amplifier 32 to control the pulse width of the waveform output from the modulator 40 to instantaneously correct any flux imbalance.

It is noted that although the soft-start control 54 of the present invention is illustrated for a push-pull DC to DC converter, the control may also be used with a pulse width modulated DC to AC inverter or regulator.

We claim:

1. In a converter controlled in response to a pulse width modulated waveform to provide a DC output, the converter having an error detecting means for comparing the output of the converter to a reference signal to vary the duty cycle of the pulse width modulated (PWM) waveform, improved means for controlling the start-up of said converter to limit inrush currents, comprising:

means for signaling the start-up of the converter; and
    means for providing a varying reference signal to said error detecting means, said reference signal gradually incresing from zero to a predetermined level so that the duty cycle of the PWM waveform gradually increases following the signaled start-up of said converter.

2. In a converter controlled in response to a pulse width modulated waveform to provide a DC output, the converter having an error detecting means for comparing the output of the converter to a reference signal to vary the duty cycle of the pulse width modulated waveform, improved means for controlling the start-up of said converter, comprising:

means for signaling the start-up of the converter; and
    means for providing a varying reference signal to said error detecting means, said reference signal gradually incresing from zero to a predetermined level in response to the signaled start-up of said converter wherein said reference signal providing means includes a capacitor and a constant current source for charging said capacitor.

3. The converter of claim 2 wherein the reference signal providing means further includes a zener diode connected in parallel with said capacitor to limit the voltage across the capacitor to said predetermined level.

4. The converter of claim 2 wherein the means for signaling the start-up of the converter includes a normally closed switch coupled across the capacitor, said switch being opened when power to the converter is turned on.

5. In a converter having a DC source, a pair of power switches, an output transformer and a pulse width modulation control for alternately closing the power switches to connect the DC source with said output transformer to produce a regulated output and having an error detecting means for comparing the output of the converter to a reference signal to provide an error signal to said pulse width modulation control, improved means for controlling the start-up of said converter comprising:

means for signaling the start-up of the converter;
    means for providing a varying reference signal to said error detecting means, said reference signal gradually increasing from zero to a predetermined level in response to the signaled start-up of the converter; and
    flux balance control means for sensing an imbalance in the currents flowing through the power switches to provide a correction signal for modifying the error signal output from said error detecting means.

6. The converter of claim 5 wherein said means for providing said reference signal includes a capacitor and a zener diode connected in parallel and a constant current source for charging the capacitor to a level determined by said diode.

* * * * *